Oct. 10, 1944.   W. T. HANSON, JR., ET AL   2,360,225
MASKING
Filed June 10, 1942
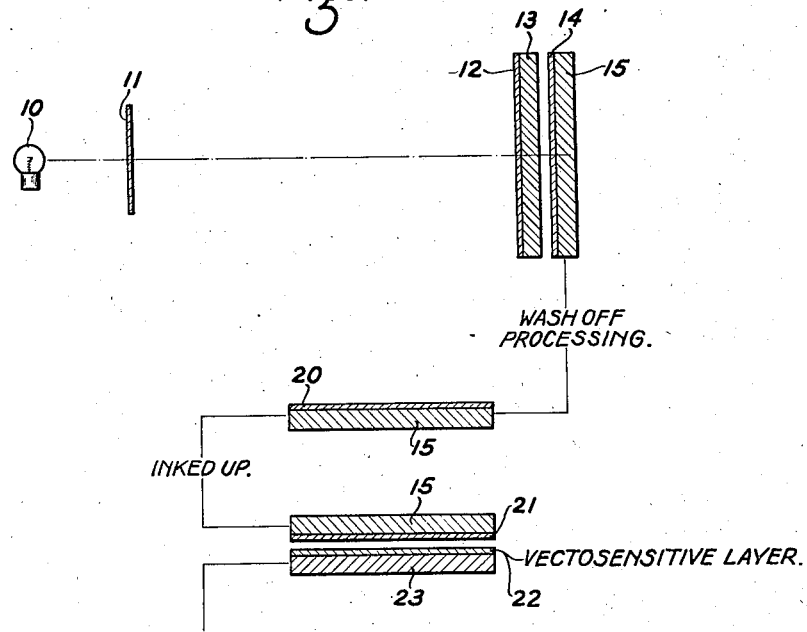
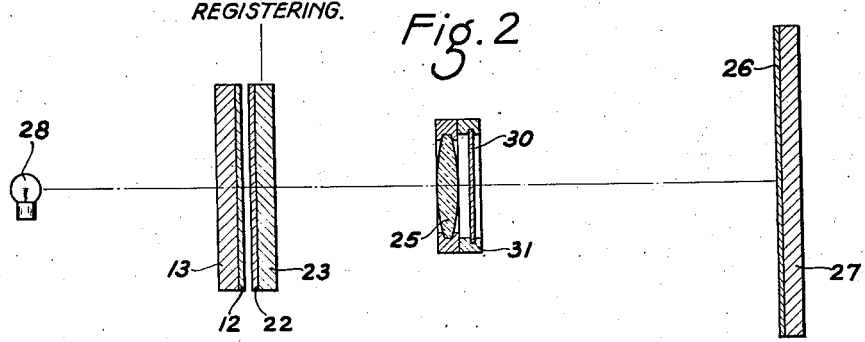
Wesley T. Hanson Jr.
Ralph M. Evans
INVENTORS Patented Oct. 10, 1944

2,360,225

UNITED STATES PATENT OFFICE 2,360,225

MASKING

Wesley T. Hanson, Jr., and Ralph M. Evans, Rochester, N. Y., assignors to Eastman Kodak Company, Rochester, N. Y., a corporation of New Jersey Application June 10, 1942, Serial No. 446,445

9 Claims. (Cl. 95—2)

This invention relates to photographic masking such as that used for color correction in color reproduction processes, but also has more general application.

It is the general object of the invention to provide an improved type of masking specifically a type which permits contrast control. The contrast control may be considered either with respect to the contrast of the mask or with respect to the total contrast of the combination of a photographic transparency and the mask therefor. In the first case the control of contrast is to control the degree of masking during printing and in the second case it is purely for controlling the overall contrast of the combination.

It is an object of the invention thus to provide a method and means for controlling the ratio of the contrast of a transparency and to the contrast of a mask for, and while in combination with, the transparency.

It is the specific object of a preferred embodiment of the invention to give an improved color correcting mask and an improved form of masking for use with a multicolored transparency. This embodiment may be used either when making a series of color separation negatives (or positives) from the transparency so that the degree of masking may be varied for the various negatives or when duplicating or printing directly onto color developable materials.

Although the degree of masking in any color process depends primarily on the reproduction process and dyes used, it has been found that, for some more or less unexplained reason, the degree of masking necessary is different for different originals. Possibly this is due to variations in processing of the original. However, simple examination of the original negative or positive is not sufficient to determine just what degree of masking is to be used. Therefore, the main purpose of the present invention is to permit the degree of masking to be varied after the mask has been made.

According to the present invention all of the above objects are accomplished by masking the original photographic record with a vectograph containing an image corresponding to the record and printing from this masked record onto a photosensitive layer by polarized light. The light may pass through a polarizer anywhere in the system between the light source and the photosensitive surface. To adjust the ratio of the mask contrast to the record contrast, the plane of polarization of the light relative to the vectograph is adjusted before printing onto the photosensitive surface. A vectograph is a record containing an image made of polarizing elements or crystals so that the absorption thereof depends on the direction of polarization of light incident on the vectograph. Various methods of making vectographs are known. Some of them involve a vectosensitive layer which is not of itself polarizing, but which has the molecules or elements thereof oriented so that it becomes plane polarizing when acted upon by a suitable "ink," the degree of polarization depending upon the amount of ink applied. Other forms employ a sheet polarizer in which the polarization is destroyed either by the amount of light or heat falling thereon or in proportion to another type of "ink." All of these are known and the present invention is not concerned with which form of vectograph production is used.

The original photographic record may be either black and white or colored, but the present invention is, of course, most useful with multicolored originals requiring masking for their reproduction. The mask may be printed from the record either by contact or by projection and the production thereof usually involves the intermediate step of making a wash-off relief image from which a vectograph controlling ink is imbibed by a vectosensitive layer. The actual printing of the mask may be out of focus to gain the advantages of J. A. C. Yule's invention described in patent application Serial No. 438,633, filed April 11, 1942. Most vectographs are black and white, but colored vectographs and even multicolored vectographs are known. The mask may, correspondingly, be black and white or may be colored to produce the advantages of the Evans' invention described in Serial No. 413,442, filed October 3, 1941, or multicolored to gain the advantages of the Yule invention described in Serial Nos. 437,155 and 6, filed April 1, 1942. The printing from the combination of this photographic transparency and a vectograph mask in register therewith may be by contact or by projection and when the original is multicolored, may be onto color separation negatives successively or onto a multilayer or otherwise differentially sensitized material developable directly to a colored image. Of course, the original may be either positive or negative.

In printing from a multi-colored transparency, the image contained by the vectograph should be the color separation of the transparency necessary for color correction. That is, the mask should be printed by light of the proper color to give the color correction desired in the reproduction process. The amount of this correction is then controlled by adjusting the orientation of a polarizing filter somewhere in the printing beam. If the original is black and white or if it is colored and the vectograph image is printed therefrom by white or neutral light, the mask is independent of any colors in the original record and acts solely for contrast control, not for color correction during the reproduction. On the other hand, the vectograph mask is especially useful when printing onto a multi-layer color material since the degree of masking may be adjusted after the mask has been made. Thus, the combination of a multicolored transparency original and a colored correcting vectograph mask is such that the degree of correction introduced into the printing process may be varied at will when making prints from the combination.

The invention will be understood from the following description when read in connection with the accompanying drawing which shows:

Fig. 1, the making of a vectograph mask.

Fig. 2, one embodiment of the present invention.

In Fig. 1 light from a source 10 passes through a filter 11 which may be neutral or colored depending on the purpose to which the mask is to be put and through a photographic record 12 carried by a support 13 to expose a photosensitive layer 14 carried by a support 15. The record 12 is usually a multi-colored image and, when color correction is desired, the filter 11 is of the color corresponding to the type of correction needed. This photosensitive layer 14 is developed by the usual wash-off process to a relief image 20. The relief image 20 is then inked with a suitable vectograph ink to form an inked relief 21 in which the distribution of the ink is proportional to the separation image recorded therein. The inked relief 21 is then pressed into intimate contact with a vectosensitive layer 22 which in the known manner becomes polarizing in a degree proportional to the amount of ink transferred. The vectosensitive layer is carried by a support 23 and constitutes a vectograph which is a mask from and for the original photographic record 12. The particular method of making the vectograph mask is not critical.

In Fig. 2 a print is made from the original 12 by projection through a lens 25 onto a photosensitive surface 26 carried by support 27. The print may be a color separation negative in which case it is processed to black and white or may be a color film carried either on a transparent or a white support and processed to a colored picture. According to the invention, light from a source 28 used in this printing, passes through the original 12 and through the mask 22 which has been placed in register therewith and either in contact or slightly out of contact with the original. Of course, the mask may be in register with a projected image of the original 12 or vice versa, but in practice it is usually more convenient to have them in contact or substantially in contact.

Either in front of the source 28 or preferably over the lens 25 as shown is mounted a polarizing filter 30 which may be rotated relative to the vectograph 22 by a suitable rotatable mount 31. When the vibration axis of the polarizing filter 30 is parallel to the vibration axis of the vectograph 22, the contrast of the vectograph is a minimum, and hence, gives minimum masking of the original record 12 whose contrast is independent of the orientation of the polarizing filter 30. When the polarizing filter 30 is rotated so as to be crossed with respect to the vectograph, the vectograph has a maximum effective contrast and gives a maximum degree of masking. A maximum degree of masking reduces the overall contrast of the combination record and mask when the mask is negative with respect to the original.

Usually when masking a multi-colored original, a universal mask of say 40% is used and usually a range of from 20 to 55 or 60% is sufficient. In fact, the actual value required is very nearly constant for any one reproduction process so that the control necessary need extend only over a fairly small range, say 30 to 50% masking. Thus, a vectograph whose contrast varies by a ratio of 3 to 5 as the orientation of the incident beam is changed, is sufficient for most purposes. This means that the vectograph image need not be made entirely of purely polarizing elements but may consist partly of a density which is independent of the polarization of the light. This is fortunate since practically all of the vectograph processes in use do contain a residual constant density image. This constant density image is not detrimental to the present invention which can operate either with or without such an image forming part of the mask.

This invention may be combined with that described in our copending application, Serial No. 446,444, filed concurrently herewith, as described in that application.

Having thus described the principle of our invention and the preferred embodiments thereof, we wish to point out that the invention is not limited in this manner but is of the scope of the appended claims.

What we claim and desire to secure of Letters Patent of the United States is:

1. The method of photographic reproduction which comprises masking a photographic record with a vectograph containing an image corresponding to the record and in exact register with the record, adjusting the plane of polarization of said light relative to the vectograph to adjust the ratio of the mask contrast to the record contrast and then printing onto a photosensitive layer from the masked record by polarized light.

2. The method according to claim 1 including the step of adjusting the plane of polarization of said light relative to the vectograph to adjust the ratio of the mask contrast to the record contrast before said printing onto a photosensitive layer.

3. The method according to claim 1 in which the record is a multicolored transparency and the image contained by the mask is the color separation of the transparency necessary for color correction during said reproduction.

4. The method according to claim 1 in which the vectograph image is negative with respect to the record.

5. The method according to claim 1 in which the vectograph image is independent of any colors in the record whereby the mask is used solely for contrast control.

6. The method according to claim 1 in which the record is a multicolored transparency and the photosensitive layer contains differentially spectrally sensitized parts to be processed directly to a multicolored record.

7. The method of printing color separation cords from a multicolored transparency which comprises masking the transparency with a vectograph containing an image corresponding to the transparency, printing in succession onto photosensitive layers through the primary color filters from the masked transparency by polarized light and before each printing adjusting the plane of polarization of said light relative to the vectograph to adjust the ratio of the mask contrast to the transparency contrast.

8. The combination of a photographic transparency and in exact register therewith a vectograph mask containing an image corresponding to the record at every point, the mask being negative to the transparency with a contrast, for one direction of polarization of light incident thereon, equal to that required for correcting the transparency.

9. The combination of a multicolored transparency and in exact register therewith a color correcting vectograph mask whose contrast varies with the direction of polarization of light incident thereon, the mask being negative to the transparency and the range of contacts including that required for color correcting the transparency.

WESLEY T. HANSON, Jr.
RALPH M. EVANS.